Figure 7:
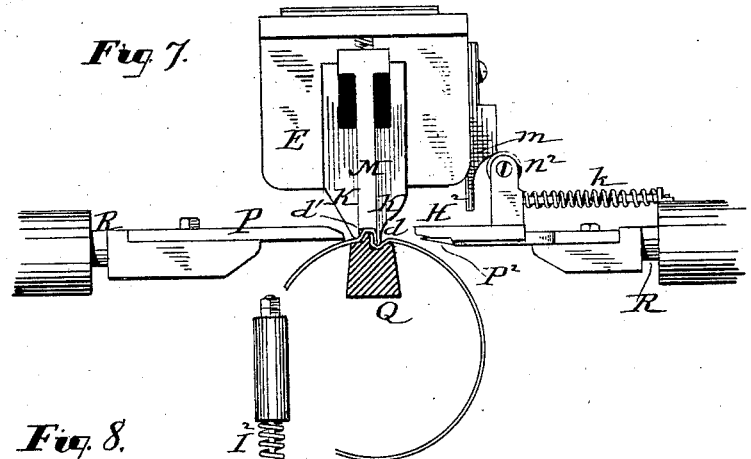

(No Model.) 5 Sheets—Sheet 1.
W. J. GORDON & E. D. GILBERT.
MACHINE FOR SEAMING METALLIC CANS.
No. 307,039. Patented Oct. 21, 1884.
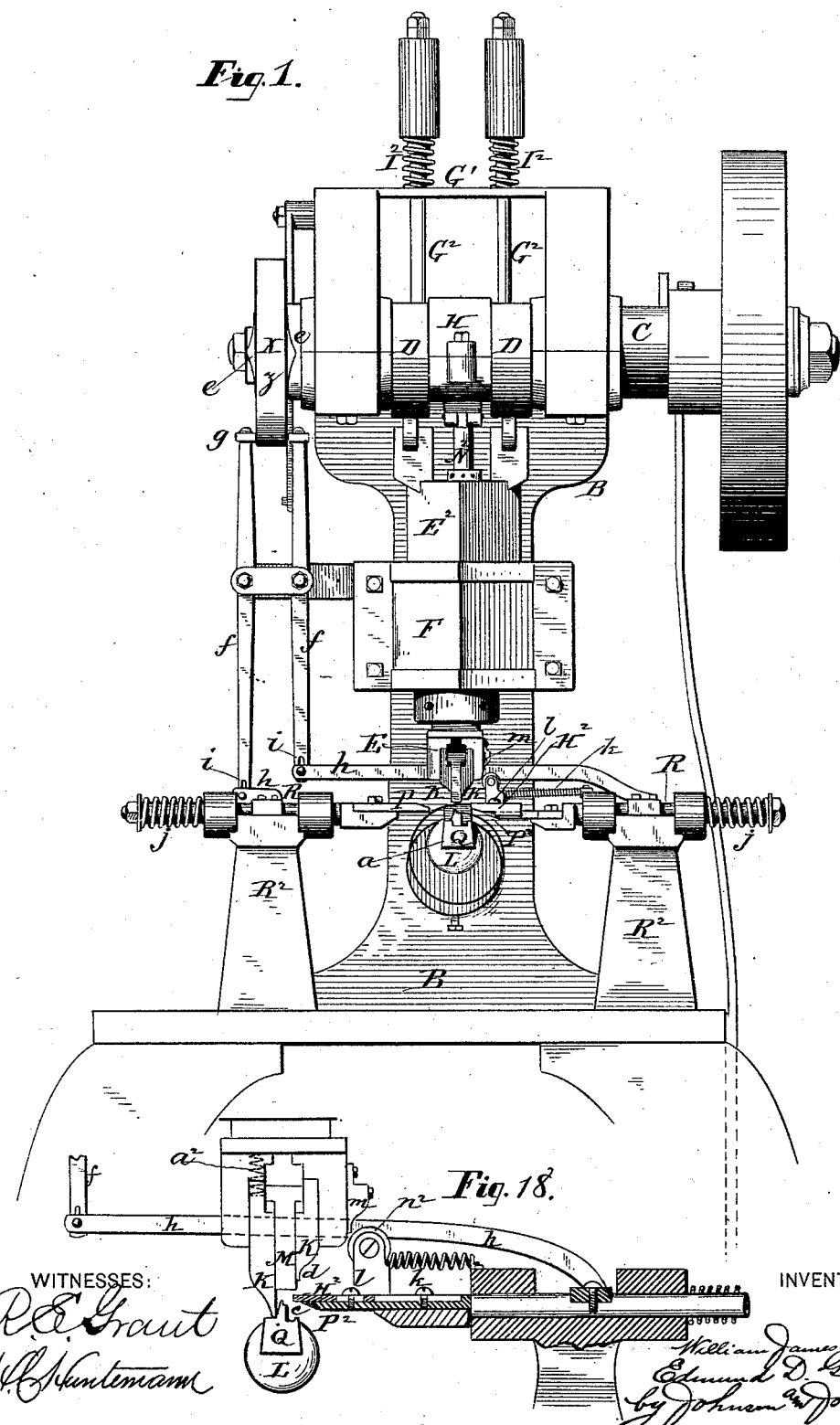
WITNESSES:
R. E. Grant
J. C. Huntemann
INVENTORS:
William James Gordon
Edmund D. Gilbert
by Johnson & Johnson
Attys.
N. PETERS. Photo-Lithographer, Washington, D. C.

(No Model.) 5 Sheets—Sheet 2.
W. J. GORDON & E. D. GILBERT.
MACHINE FOR SEAMING METALLIC CANS.
No. 307,039. Patented Oct. 21, 1884.
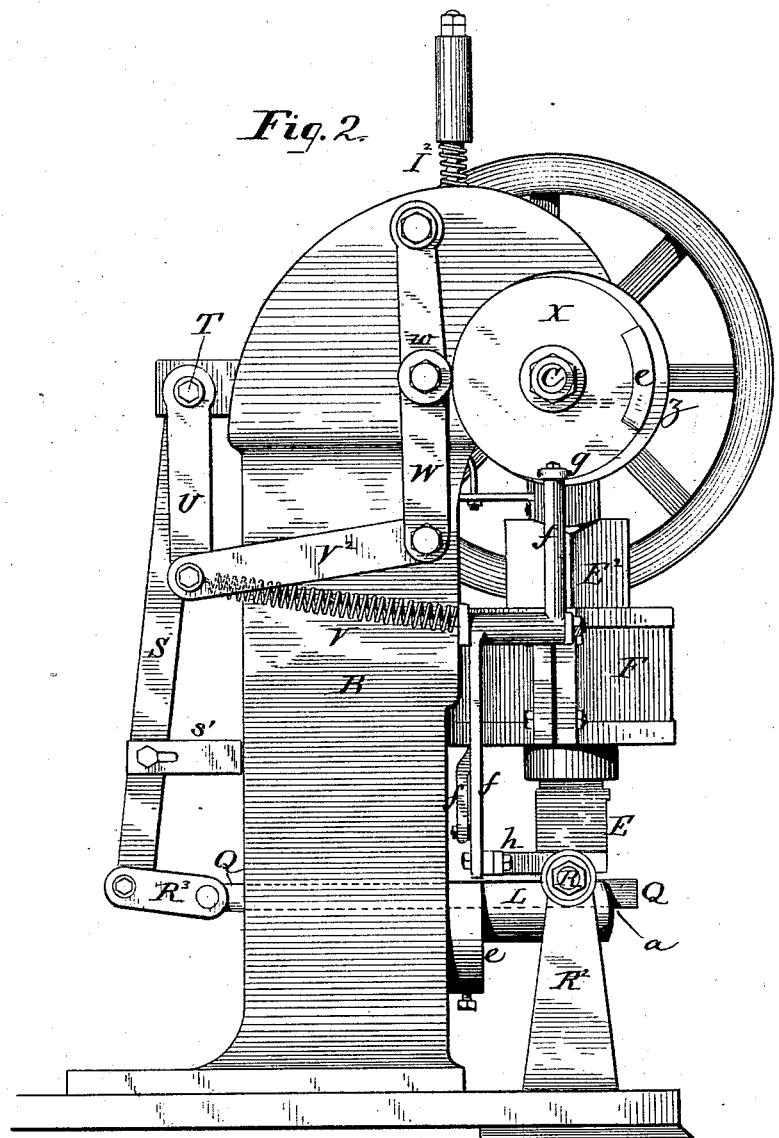
WITNESSES:
R. E. Grant
J. A. Huntemann
INVENTORS:
William James Gordon,
Edmund D. Gilbert,
by Johnson and Johnson
Attys.
N. PETERS, Photo-Lithographer, Washington, D. C.

(No Model.) 5 Sheets—Sheet 3.
W. J. GORDON & E. D. GILBERT.
MACHINE FOR SEAMING METALLIC CANS.
No. 307,039. Patented Oct. 21, 1884.
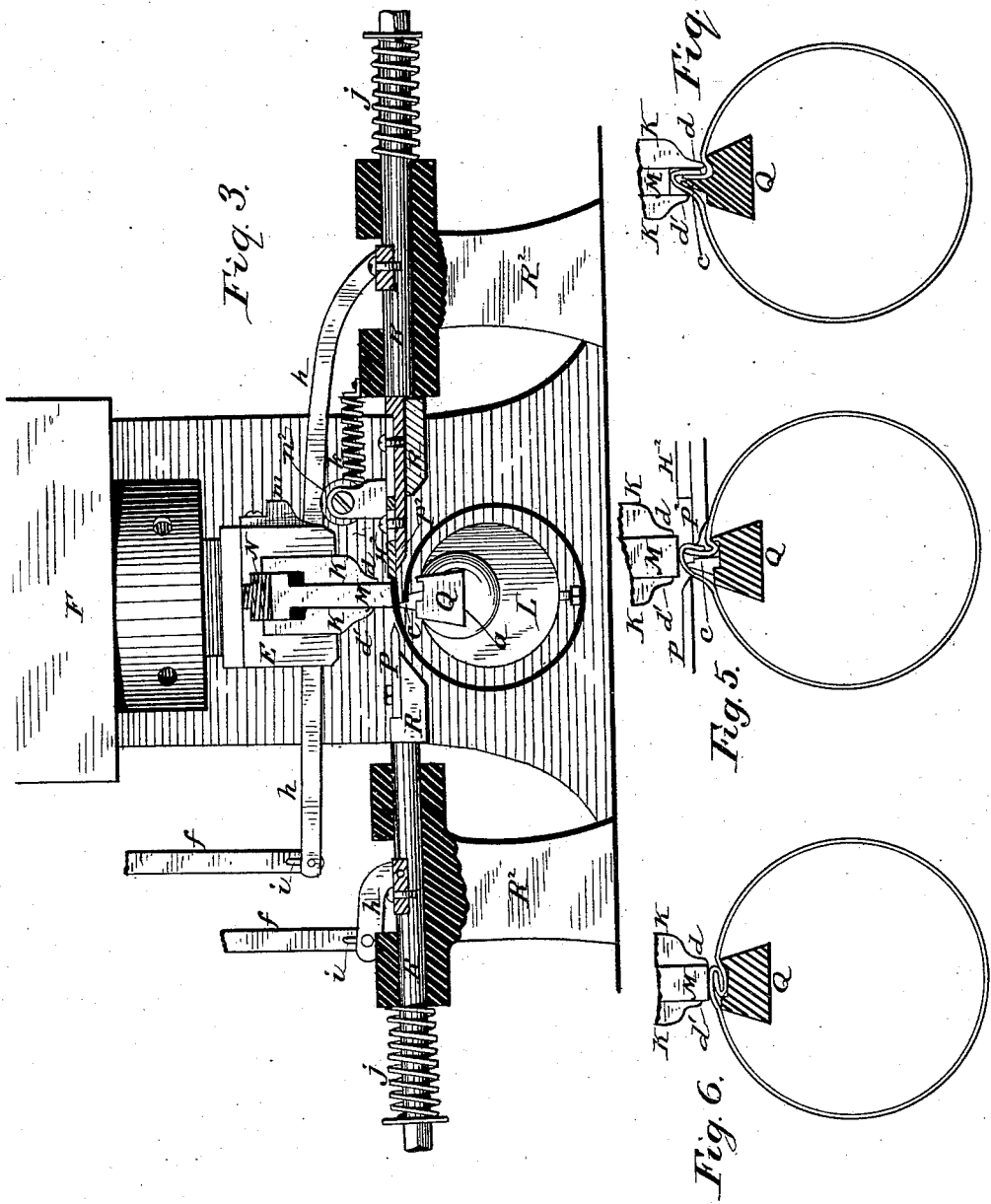

(No Model.)  5 Sheets—Sheet 4.

W. J. GORDON & E. D. GILBERT.
MACHINE FOR SEAMING METALLIC CANS.

No. 307,039. Patented Oct. 21, 1884.

WITNESSES: INVENTORS:

(No Model.) 5 Sheets—Sheet 5.

W. J. GORDON & E. D. GILBERT.
MACHINE FOR SEAMING METALLIC CANS.

No. 307,039. Patented Oct. 21, 1884.

WITNESSES:
R. E. Grant
H. Huntemann

INVENTORS:
William James Gordon
Edmund D. Gilbert
by Johnson & Johnson
Attys.

United States Patent Office.

WILLIAM JAMES GORDON AND EDMUND D. GILBERT, OF PHILADELPHIA, PENNSYLVANIA.

MACHINE FOR SEAMING METALLIC CANS.

SPECIFICATION forming part of Letters Patent No. 307,039, dated October 21, 1884.

Application filed June 30, 1884. (No model.)

*To all whom it may concern:*

Be it known that we, WILLIAM JAMES GORDON and EDMUND D. GILBERT, citizens of the United States, residing at Philadelphia, in the county of Philadelphia and State of Pennsylvania, have jointly invented new and useful Improvements in Machines for Seaming Metallic Cans, of which the following is a specification.

Our invention relates to machines for forming the seams of sheet-metal cans; and our improvements consist in a novel construction and combination of seam-forming devices adapted to make a four-ply seam, as distinguished from such machines in which the seam is formed with a three-ply lap.

In an application for a patent for machine for seaming metallic cans made February 19, 1884, under Serial No. 121,237, by William J. Gordon, a certain organization of vertically-operating seam-forming devices is described and claimed therein, in combination with a can-holder provided with a horizontal intermittently-sliding bar having a die and a groove co-operating with the vertical dies, and a hammer to form and complete the seam and eject the seamed article from the holder by the movement of said sliding die-bar, which is seated in a groove in said holder. In the operation of forming the seam in the said above-mentioned machine, the sliding bar presents its die for the crimping action upon the lapped ends of the sheet metal, then carries its die from beneath the crimped seam to bring in place of said die the groove within which the crimped seam is compressed, and, by the return movement of said bar to bring its die again beneath the vertical dies, automatically eject the seamed article from the can-holder. In our improved organization of seam-forming devices, we employ this horizontal intermittently-sliding die-bar in precisely the same relation and co-operation with vertical dies and a hammer, as set forth in the said application; but we have combined therewith horizontal tucking-jaws, the function of which is to tuck the lap so as, in connection with a spring-pressed hammer, to give its top portion a slight under bend on the top side, such tucking action taking place at the time the die-bar is withdrawn from the lap, so that the hammer will turn the lap in the proper direction, the said jaws holding the lapped parts closely together during the withdrawal of the die-bar. For this purpose the tucking-jaws are arranged to operate in different horizontal planes, the lower one pressing against the seam at the vertical lapped side, while the upper tucking-jaw presses against the opposite side of the lapped seam just below its top, and thus, in connection with a pressing-hammer, turns the top of the lapped seam or crimp slightly to its lapped side, thus placing the lapped ends in position to be struck down flat into a four-ply seam within the groove of the sliding die-bar. The hammer is driven by the positive blow of an independent driver, and it is sustained by a spring which acts to raise it and to hold it up within the head of the slide at the proper time, while a spring or springs within the head of the slide act to press and hold the hammer down upon the crimped seam to prevent its lapped ends from springing apart when the vertical dies are being raised and during the action of the tucking-jaws, the said springs acting to balance each other when the hammer is up. This construction gives the advantage of operating the hammer by a positive blow, and of utilizing it to hold the top lap of the crimp to receive the action of the vertical dies, and also to hold the crimped lap under the action of the tucking-jaws.

Referring to the accompanying drawings, we will describe the construction and operation of our improved can-seaming machine, and specifically declare the several matters which constitute our improvement.

Figure 8:
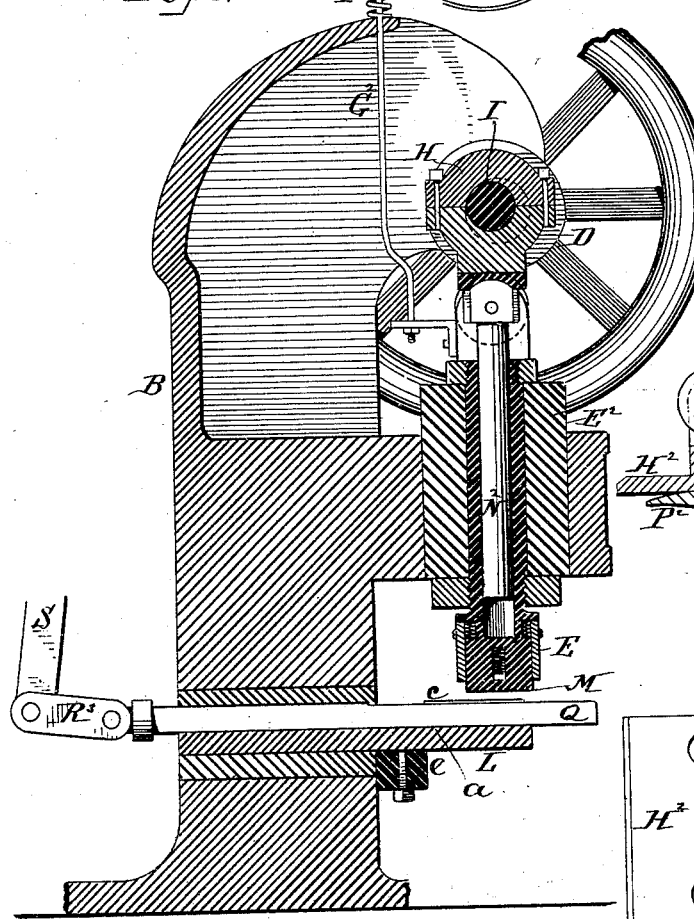
Figure 9:
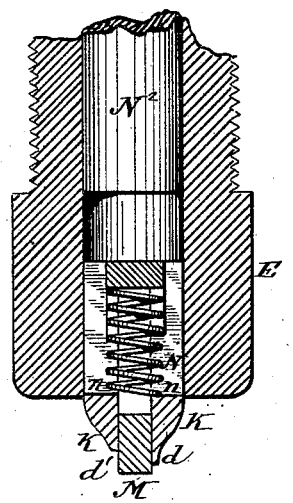
Figure 10:
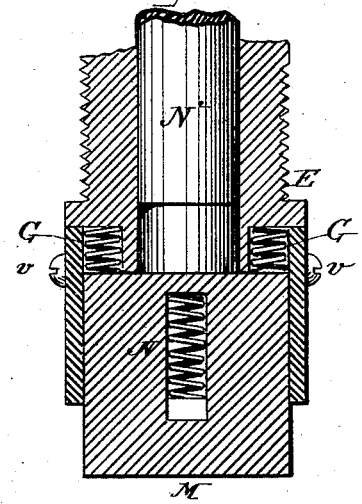
Figure 14:
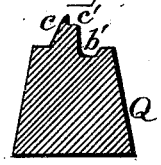
Figure 11:
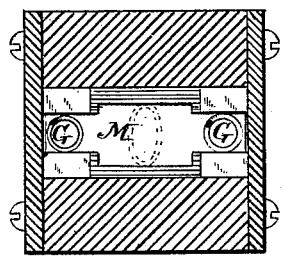
Figure 15:
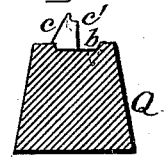
Figure 12:
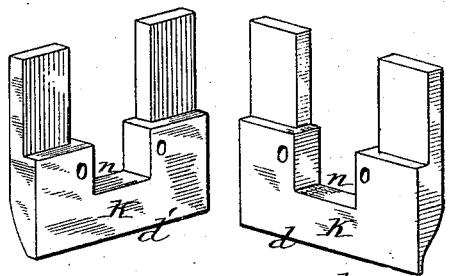
Figure 13:
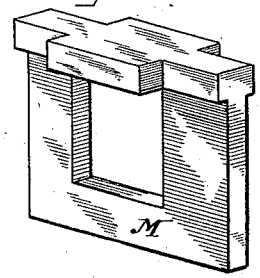
Figure 16:
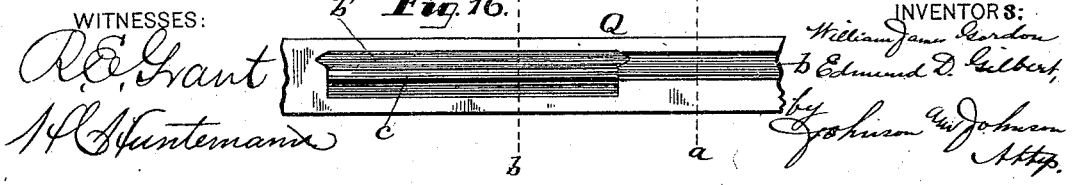

Figure 1 in the drawings represents in front elevation said machine, the parts being in position to allow the can-body to be adjusted upon the can-holder; Fig. 2, a side elevation of the same; Fig. 3, a front elevation, enlarged, of the seam-forming devices in the position to make the first step in the operation of forming the seam; Fig. 4, a detail of the seam-forming dies in the position after having effected the first step in the operation, which is crimping the lapped ends over the bar-die; Fig. 5, a similar detail illustrating the second step, in which the tucking-jaws co-operate with the hammer to tuck and bend the top of the crimped seam over to the lapped side after the forming-die $c$ is drawn back; Fig. 6, a similar detail showing the completion of the seam by the blow of the hammer; Fig. 7, a front detail view showing the non-acting position of the tucking-jaws during the action of the crimping-dies; Fig. 8, a vertical section of the machine, particularly showing the relation of the independent driver with the hammer; Fig. 9, a vertical section of the vertical die slide or head, showing the normal position of the dies and hammer; Fig. 10, a similar section taken at right angles to Fig. 9; Fig. 11, a horizontal section on the line $v\,v$ of Fig. 10. Fig. 12 represents the vertical die-jaws separated; Fig. 13, the hammer; Fig. 14, a cross-section of the horizontal sliding die-bar, taken through its shouldered die; Fig. 15, a similar section, taken through its groove in front of the die; Fig. 16, a top view of the die-bar; Fig. 17, a perspective view of the same; Fig. 18 shows a modification of the tucking-jaws of the seam-forming devices, and Figs. 19 and 20 a section and top view of the gage.

Our improved seam-forming device can be used with any suitable operating-press, such as that shown and described in a patent granted to William J. Gordon, December 16, 1879, in which the driving-shaft C, mounted horizontally at the top and front of a standard, B, has suitable treadle-clutch connections for controlling the operation of the seam-forming devices, and is connected with and operates the vertical die slide or head and a hammer. The die slide or head E is fitted to move vertically in a guide, F, at the front of the standard, and the can-holder L is firmly fixed within and projects from the front of the standard just beneath and centrally with the die-slide. It is of cylindrical form, and is provided with a longitudinal groove, $a$, in its top, of dovetail form in cross-section, to receive and hold in place the horizontal sliding bar Q, which carries on its upper surface the die $c$, which has a length a little greater than the seam to be formed. In front of this die $c$ the slide has a top groove, $b$, open at its front end, and has a length in front of the die $c$ a little greater than the length of the seam to be formed, and a depth and width sufficient to receive the lapped metal of the seam when forced down therein by the hammer. This groove extends the length of the die $c$, but has a less width along the side of the die. The die $c$ has a shoulder, $c'$, just below its top edge, upon which the edge of the underlap of the article to be seamed rests, while the edge of the overlap rests upon the top of the die $c$ when the can-body is adjusted upon the holder. The vertically-operating dies K K are fitted within the slide or head E, so that their acting edges will operate on each side of the horizontal die $c$, and they are of a length about equal to that of said die $c$. They are shown in Fig. 12, and are secured within an opening within the head E in any suitable manner, so that their forming ends or edges extend below the head E. The die edge $d$, which operates to crimp the lapped metal within the groove $b'$, along the die $c$, projects below the acting edge $d'$ of the other die, so as to press the metal of the underlap over the vertical side of the die $c$ within the groove $b'$, while the other die, $d'$, presses the metal over and upon the inclined side of said die $c$ in the operation of forming the proper crimp of the lapped ends. The hammer M is arranged to operate between the dies K, and is shown in Fig. 13. It is supported between the inner sides of the dies K by means of a coil-spring, N, upon which the top bar of the hammer rests, while the spring itself rests upon the dies K at $n$, as shown in Figs. 9 and 12, so that it tends to constantly press the hammer up. The dies and the hammer are made open to receive the spring, which is compressed by the descent of an independent driver, $N^2$, as will be presently described. Upon the top of the hammer springs G G are placed at each end, as shown in Figs. 10 and 11, so as to constantly press the hammer down upon its supporting-spring. These top springs serve to press and hold the hammer upon the crimped seam before the vertical dies commence to act, and after the vertical dies commence to rise, and thus prevent the lapped crimped ends from separating or springing apart as the horizontal die $c$ is withdrawn, and the tucking-jaws are moving forward upon the crimped lap. The force of the top spring, G, is sufficient to hold the hammer under a downward pressure, as stated, during which the lower spring, N, is only slightly compressed, and these lower and upper springs balance each other, so as to leave the hammer in its normal position above the die $c$, to allow the cam-body to be placed upon the said die, as shown in Figs. 1 and 3. The driver $N^2$ operates through a central opening in the slide $E^2$ and die-head E, and has a pivoted connection with a strap, H, on a crank, I, of the driving-shaft C, as shown in Fig. 8, whereby the hammer is driven by a quick blow upon the seam. The die-head or slide $E^2$ is depressed by eccentrics D D on the shaft C, acting upon rolls at the top of said slide, while the upward movement of the latter is effected by the springs $I^2\,I^2$ and rods $G^2\,G^2$, connecting said slide with said springs, which latter are compressed upon the top bar, G', by the descent of the slide, so that the expansive force of the springs act to raise the die-head or slide as soon as the eccentrics cease to act.

Except in the particular of the independently-operating hammer and its operating-springs, the seam-forming dies, their construction and operation are the same as set forth in the said Gordon application, filed as aforesaid, and it is with these die-forming devices that we have combined tucking-jaws for giving the lapped ends a slight under bend at the vertical side, so as to cause them to turn with certainty when struck by the hammer to render perfect the four-ply seam. These tucking-jaws P and P² are arranged to operate horizontally on each side of the die c of the sliding bar Q, and in different horizontal planes. Their acting edges are equal in length to that of the die c, and they are formed of plates firmly bolted to the flattened ends of rods R, which are fitted to slide in pillow-block bearings R², fixed on a table-stand on each side of the can-holder L, so that the tucking jaws will be moved toward and from the opposite sides of the die c. The lower tucking-jaw acts against the lapped edges after they are crimped over the vertical side of the die c, and simultaneously therewith the upper tucking-jaw acts upon the opposite side of the crimped seam, so as to, in connection with the pressure of the hammer, bend the top of the crimped seam over, the die c having been withdrawn, while the lower tucking-jaw is held against the vertical side of the overlap, as shown in Fig. 5. In this way the lower jaw holds the lapped ends so as to tuck them under while the top of the crimped seam is being pushed over by the upper jaw, the hammer meanwhile co-operating to press and hold the crimp down so that the lapped edges cannot open upward during this tucking operation. These tucking-jaws are operated simultaneously by the cams e e, which are arranged on the side of the cam-wheel X, which operates the horizontal die-bar Q, as shown in Figs. 1 and 2. The operating connections consist of the equalizing-arms f f, pivoted to a bracket on the side of the standard, having rolls g g at their upper ends to receive the action of the side cams, while at their lower ends said arms are connected by bars h h to the slide-bars R of the tucking-jaws. The movement of the tucking-jaws in relation to the die c is adjusted for proper action by setting the ends of the connecting-bars h h higher or lower in the slots i i of the equalizing-bars. The return movements of the tucking-jaws are effected by springs j j, arranged on the outer ends of the slide-bars, so as to press against the ends of the pillow-block bearings and collars on the ends of said bars, so that the moment the cams e e pass the rolls of the equalizing-arms the tucking-jaws are moved away from the crimped seam. The die bar or slide Q is operated by a circumferential cam, z, on the cam-wheel X, the action of the cam being communicated to said die-bar by means of a hanging rock-arm, W, having a bearing-roll, w, kept in proper relation with the cam-wheel by a spring, V, and connected at its lower end by a link, V², with a rock-arm, U, on the end of a horizontal shaft, T, which is connected by a vertical arm, S, with the rear end of the die-bar Q by links R³, as shown in Fig. 2. The spring constantly tends to force the arm S and its connected die-rod forward, the extent of such movement being limited by a stop, s', placed on the arm S, so as to strike against the standard, so that the die c is carried beneath the vertical dies, while the projection of the cam z is only sufficient to carry the die c inward to bring the groove b in position beneath the hammer to effect the compression of the seam. As the cam-wheel is revolved the rock-arm W is oscillated by the action of the cam z and the spring V, and the intermittent movement of said rock-arm is communicated to the arm S, giving an intermittent movement to the die-bar Q, properly timed with the action of the upper dies and with the action of the hammer. Provision is made for determining the width of the seam and for adjusting the width to suit different-sized cans by means of a slide-gage, H², placed upon the lower tucking-jaw in a horizontal plane just above the top of the die c, so that when the tucking-jaws are in their normal position, as shown in Figs. 1 and 3, the end of the gage will project beyond the end of the lower tucking-jaw to receive the edge of the overlap of the can-body, while the edge of the underlap rests on the shoulders c' of the die c, and thus gage the lap for the seam. A spring, k, constantly presses the gage toward the die c, and the limit of such projection is determined by the set-screws l passing through slots in the slide-gage. The gage is moved back away from the die in its descent by a cam projection, m, on the side of the die-head, acting against a roll, n², carried by the gage-slide, whereby the latter is moved back upon the tucking-jaw as the vertical die is moved down to its work.

Referring to the tucking-jaws, it is important to notice that the function of the lower jaw is to tuck the lapped ends of the seam under, in proper position to receive the pressure of the hammer, while the latter and the upper tucking-jaw are pressing upon the crimped seam to guard against the liability of the upper half of the lap getting out of place before it is properly formed. In Fig. 18 we have shown a modification in which the same action is practically effected by dispensing with the upper-jaw tucker and make the upper die on that side to operate with a spring, a², which holds the jaw down on the seam till the other vertical die is withdrawn and the under tucking-jaw has performed its work, and the hammer is down ready to be struck by the driver. In this modification the vertical spring-die is held down as the die-head rises, and the horizontal tucking-jaw is moving up to its work.

Any suitable form of clutch mechanism may be employed so long as it is adapted to cause the motion of the operating-shaft to stop at the proper time by operating a foot-lever. As stated, the die c joins the closed end of the groove b', and rises from one side of the latter in position to enter the space between the vertical dies beneath the hammer, so that the vertical face of the die c and the inner side of the vertical die d lap each other when they are brought together to crimp the lapped ends of the metal between them, in which action the underlap is pressed into the groove and against the vertical side of the die c, and the over lap is crimped over the said die outside of the under lap. The crimping of the lapped ends is effected over the die c, and the tucking of the crimped seam to turn its lapped ends to one side, as stated, is effected after the die c is withdrawn, while the compression or flattening of the seam is effected within the groove b, and for this purpose the die-bar Q has a positive intermittent sliding movement controlled so that it will bring the die c out in proper relation to the can-holder and to the vertical dies to form the crimp, while the inward movement of the bar Q will bring its wide groove b in exactly the position from which the die c was removed to receive the compression action of the hammer, as shown in Fig. 6. In this position the outer end of the die is back of the inner edge of the can-blank and of the shoulder e at the base or inner end of the can-holder L, so that the outward movement of the die-bar Q will cause the outer end of the die to strike the inner edge of the can-body and eject or push it from the holder. The can-blank is placed upon the holder L against its shoulder e, and the movement of the die-bar is controlled so that its inward stroke will carry the outer end of the die back of said shoulder e in position to eject the seamed body, as stated. The can-body is placed upon the holder L and its edges upon the die c, with the edge of the over lap resting against the gage $H^2$, as shown in Figs. 1 and 3. The die-head then descends, bringing its hammer upon the top lap to hold it upon the die c by the force of the top springs, G G, which are thereby compressed. The dies K K, descending at the same time, crimp the lap over the die c, so as to form the vertically-projecting seam, (shown in Fig. 4,) so that the hammer and the three dies coact to make the crimp. The dies then rise sufficiently to release their pressure upon the die-bar Q, when the latter is drawn back to carry its die c from beneath the hammer, the latter and the dies meanwhile holding the lapped projecting seam during the withdrawal of the die c. The dies then rise to allow the tucking-jaws to move forward against the opposite sides of the crimped seam to compress and tuck the lapped crimped seam, and under the pressure of the hammer turn the top part of the crimp toward the lapped side, so that the hammer will turn the laps together down into the bar-groove b, as shown in Fig. 5. The tucking-jaws then separate and the hammer descends upon the crimped seam, turning it down and pressing it into the groove to complete the seam. The driver $N^2$ is raised by its crank-connection, and the hammer is raised by its supporting-spring N, leaving the way clear for the return movement of the die-bar to bring its die in position to eject the seamed can and to receive the next can-body, and the operation is repeated.

Figure 19:
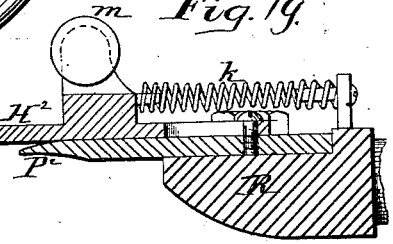
Figure 20:
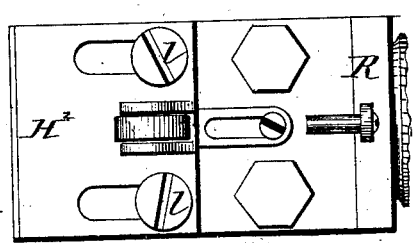

Referring to the gage, as seen in Figs. 19 and 20, it is secured to the lower tucking-jaw by screws l, passing through slots in said gage, and the forward movement of the latter is limited by the screws, as shown in Fig. 20.

We claim—

1. The combination, in a seaming-press, with vertically-operating dies, a hammer, and a horizontal intermittently-sliding bar having a die and a groove, as described, of jaws operating in connection with the hammer to tuck, hold, and to bend the crimped seam to one side, substantially as described, for the purpose specified.

2. The sliding tucking-jaws arranged as described, combined with the sliding grooved die-bar Q, the vertically-operating dies K K, a spring-sustained hammer, and an independent driver therefor, substantially as described, for the purpose specified.

3. The die-head of a seaming-press, having the dies K K, a vertically-acting hammer, a spring to raise and a spring or springs to depress it, in combination with an independently-operating driver for said hammer, an intermittently-operating grooved die-bar, and tucking-jaws arranged to operate on each of said grooved die-bars, substantially as described.

4. A sheet-metal seaming-press provided with vertically-operating dies, a horizontal intermittently-sliding die-bar, a spring-sustained hammer, and an independent driver therefor, substantially as described, for the purpose specified.

5. The combination, with the sliding grooved die-bar Q, the dies K K, a spring-sustained hammer, and the tucking-jaws, of means, substantially such as described, for intermittently operating the die-bar and the tucking-jaws, substantially as described, for the purpose specified.

6. The combination, with the sliding grooved die-bar Q, the dies K K, a spring-sustained hammer, and the tucking-jaws, of means for intermittently operating the die-bar, and the tucking-jaws, consisting of the cam-wheel X $z$, having the side cams, e e, the connected pivoted rock-arms W U S, the spring V, the pivoted equalizing-arms $ff$, their connecting-bars $h\,h$, and the reacting-springs $j\,j$, arranged upon the jaw-stems, as set forth.

7. The combination, with the grooved die-bar Q, the dies K K, the tucking-jaw $P^2$, and the seaming-hammer, of the horizontal slide-gage $H^2$, carried by said tucking-jaw $P^2$, the die-head E, provided with the cam-projection m, and the spring k, as shown, for the purpose specified.

In testimony whereof we have hereunto set our hands in the presence of two subscribing witnesses.

WILLIAM JAMES GORDON.
EDMUND D. GILBERT.

Witnesses:
GEO. W. GARRETT,
A. J. MICHEL.